United States Patent [19]
Böhme et al.

[11] 3,864,338
[45] Feb. 4, 1975

[54] PROCESS FOR THE PREPARATION OF Δ2-CEPHALOSPORIN ALDEHYDES

[75] Inventors: Ekkehard Böhme, Highstown; Joseph E. Dolfini, North Brunswick, both of N.J.

[73] Assignee: E. R. Squibb & Sons, Inc., New York, N.Y.

[22] Filed: Aug. 11, 1970

[21] Appl. No.: 63,007

[52] U.S. Cl............ 260/243 C, 260/239.1, 424/246
[51] Int. Cl............................................. C07d 99/24
[58] Field of Search ................................ 260/243 C

[56] References Cited
UNITED STATES PATENTS

| | | | |
|---|---|---|---|
| 3,351,596 | 11/1967 | Chamberlin | 260/243 C |
| 3,532,694 | 10/1970 | Somerfield et al. | 260/243 C |
| 3,607,869 | 9/1971 | Cuollo et al. | 260/243 C |
| 3,674,784 | 7/1972 | Webber | 260/243 C |
| 3,682,903 | 8/1972 | Bickel et al. | 260/243 C |

Primary Examiner—Nicholas B. Rizzo
Attorney, Agent, or Firm—Lawrence S. Levinson; Merle J. Smith; Stephen B. Davis

[57] ABSTRACT

Disclosed herein is a chemical reaction for the preparation of $\Delta^2$-cephalosporin aldehydes.

5 Claims, No Drawings

PROCESS FOR THE PREPARATION OF Δ²-CEPHALOSPORIN ALDEHYDES

BACKGROUND OF INVENTION

Δ²-Cephalosporin compounds have been recently discovered which possess antibacterial activity. Netherlands Pat. No. 6,815,631, published May 6, 1969, discloses some 3-aldehyde compounds of these Δ²-cephalosporins. However, the process of their preparation involved the hydrolysis and oxidation of a starting cephalosporin material.

THE INVENTION

A novel process for the preparation of Δ²-cephalosporin-3-aldehydes has been discovered which comprises reacting a Δ²-cephalosporin having an acyloxymethyl group in the three-position with a halogenating agent in the presence of a free radical initiator and recovering the corresponding aldehyde.

More specifically, the invention relates to reacting a Δ²-cephalosporin of the formula I:

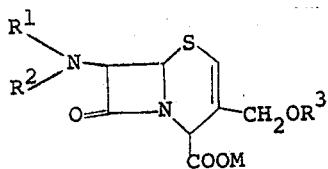

wherein $R^1$ is hydrogen or acyl; and $R^2$ and $R^3$ are acyl which may be the same or different; $R^1$ and $R^2$ together form a divalent acyl group derived from a dicarboxylic acid; and M is hydrogen, lower alkyl of from 1 to 6 carbons, or a pharmaceutically acceptable nontoxic salt thereof; with a halogenating agent followed by hydrolysis to give a formyl group in the 3-position of the cephalosporin. The $R^3$ acyl groups of the invention are a carboxylic acid radical, such as, for example, lower alkanoyl or aroyl, or lower alkoxycarbonyl or a substituted lower alkanoyl, for example, with a monocyclic or bicyclic aromatic radical, such as an unsubstituted or substituted phenyl or naphthyl radical, or above all, a straight-chain or branched aliphatic hydrocarbon radical advantageously containing at most 6 carbon atoms, for example, a lower alkyl radical such as a methyl, ethyl, propyl or isopropyl radical, or a lower alkenyl radical such as a vinyl or allyl radical. As substituents of aromatic radicals there may be present, for example, one or more lower alkyl or alkoxy groups, nitro groups and halogen atoms; substituents of aliphatic hydrocarbon radicals are, for example, aromatic radicals such as phenyl, halogenphenyl and nitrophenyl radicals, and primarily halogen atoms such as bromine, iodine, fluorine and especially chlorine.

The 7-N-acyl radical or radicals can be aliphatic, aromatic, heterocyclic, araliphatic or heterocyclylaliphatic carboxylic acid radicals, especially the acyl radical of 7-acylaminocephalosporanic acids that are known to be effective, for example, a radical of the formula:

$$R_4(CH_2)_nCO$$

in which $n$ represents an integer of 0 to 4, preferably 1, and $R_4$ represents an unsubstituted or substituted aryl, cycloalkyl, or heterocyclyl radical or, when $n$ is 0 to 4, also an aryloxy, arylthio, cycloalkoxy, heterocyclyloxy or heterocyclylthio radical, the aryl or heterocyclyl radicals being monocyclic or dicyclic, for example, 2,6-dimethoxybenzoyl, tetrahydronaphthoyl, 2-methoxynaphthoyl, 2-ethoxynaphthoyl, 3-pyridylbenzoyl, phenyl-acetyl, phenoxy-acetyl, S-phenylthioacetyl, S-bromophenyl-thio-acetyl, α-phenoxypropionyl, α-phenoxyphenylacetyl, α-methoxyphenylacetyl, α-methoxy-3:4-dichloro-phenylacetyl, pyridyl(3)-acetyl, pyridyl(2)-acetyl, benzyloxycarboxyl, S-benzylthioacetyl, S-benzylthiopropionyl, hexahydrobenzyloxycarbonyl, cyclopentanoyl, cyclohexanoyl, 2-thienylacetyl, 3-thienylacetyl, 2-furylacetyl, 2-indolylacetyl, 2-phenyl-5-methyl-isoxazolylcarbonyl, 2-(2'-chlorophenyl)-5-methyl-isoxazolyl carbonyl, indenyl carbonyl, or a radical of the formula:

$$C_nH_{2n+1}CO \text{ or } C_nH_{2n-1}CO$$

in which $n$ represents an integer of 1 to 7, and the chain is straight or branched and, if necessary, is interrupted by an oxygen atom or a sulfur atom or is substituted by halogen, carboxy or amino, for example, a propionyl, butyryl, hexanoyl, octanoyl, butylthioacetyl, acrylyl, crotonyl, 2-pentenoyl, allylthioacetyl, chloroacetyl, β-bromopropionyl, aminoacetyl, aminophenylacetyl, α-amino-2,4-cyclohexadienylacetyl or α-carboxypropionyl radical.

The salts of the compounds are metal salts, above all, the salts of therapeutically useful metals of the groups of alkali metals or alkaline earth metals such as sodium, potassium, ammonium or calcium, or salts with organic bases, for example, with triethylamine, N-ethylpiperidine, dibenzylethylenediamine, N,N'-bis-(dehydroabiethyl)ethylenediamine or procaine or others such as are known to be useful for preparing salts of penicillins or cephalosporins.

The compounds are very stable towards penicillinases and cephalosporinases. Under the conditions of therapeutic application they are stable. They display antibacterial activity towards Gram-positive bacteria, for example, *Staphylococcus aureus*, and especially towards penicillinresistant strains, but, above all, towards Gram-negative bacteria, for example, *Escherichia coli*, *Klebsiella pneumoniae*, *Salmonella typhosa* and *Bact. proteus*. They may therefore be used for combating infections caused by gram-positive or gram-negative microorganisms and also as additives for animal feedstuffs and in the preservation of foodstuffs or as disinfectants. For these purposes, they are administered in the same way as other half-synthetic cephalosporins, for instance, 7-(thienylacetylamino)-cephalosporanic acids.

The reaction proceeds effectively in the presence of catalytic amounts of a free radical source catalyst, e.g., from about 0.001 to 1 percent of reaction solution. Examples of the catalyst are peroxides, such as hydrogen peroxide, benzoyl peroxide, t-butyl hydroperoxide, acetyl peroxide, and so forth; azo and diazo-compounds such as azo-bis-isobutyro nitrile. The reaction also may proceed satisfactorily, utilizing a radical initiator such as light, etc.

The reactants are mixed under ambient conditions in the presence of from about 0.3 to 1.0 percent of a free radical source, preferably from about 0.4 to 0.7 percent of total volume. It is to be understood that slight heat up to about 40°C. will increase the rate of reaction. Although a 1:1 molar ratio of reagents is deemed satisfactory, yields can be improved if a slight excess of the halogenating agent is utilized. Hydrolysis occurs during the reaction conditions. For example, on washing the product mixture dissolved in chloroform with dil. NaHCO$_3$, dil. HCl and water, hydrolysis takes place. Of course other known methods of hydrolysis may be utilized.

Examples of halogenating agents are N-haloamides such as: N-bromosuccinimide, N-chlorosuccinimide, N-chlorophthalimide, N-bromoacetamide, and so forth, and other known halogenating agents may also be utilized such as: sulfuryl chloride, t-butylhypoiodite, molecular chlorine, molecular bromine, and so forth.

The starting Δ$^2$-cephalosporin utilized in the practice of this invention can be readily prepared by reacting their corresponding Δ$^3$-cephalosporin in an organic base such as pyridine for a period of up to about 72 hours.

Compounds of Formula I wherein R$^1$ and R$^2$ are each hydrogen can be prepared by reacting the 7-phthalimido-3-aldehyde cephalosporin compound formed by the process set forth above with hydrazine in an organic solvent, e.g., ethanol, and refluxing.

EXAMPLE 1

Methyl 3-formyl-7-phthalimido-2-cephem-4-carboxylate 1.68 Gr. (4 meq) methyl 3-acetoxymethyl-7-phthalimido-2-cephem-4-carboxylate are dissolved in 100 ml. of dry chloroform (treated with P$_2$O$_5$ and filtered through alumina) at room temperature under nitrogen. Then 7.12 mg. (4 meq) N-bromosuccinimide was added together with 0.1 mg. of azobisisobutyronitrile. The reaction is allow to proceed for 18 hours at room temperature and under nitrogen. It is then diluted with 200 ml. chloroform, washed with cold dilute sodium bicarbonate, dilute hydrochloric acid and water. The resulting organic extract is dried over magnesium sulphate and evaporated to dryness to give 1.75 gr. semi-crystalline material. This is then recrystallized from dichloromethanehexane to give 860 mg. pinkish crystals.

EXAMPLE 2

Trichloroethyl 3-formyl-7-phthalimido-2-cephem-4-carboxylate

100 Mg. (0.19 meq) trichloroethyl 3-acetoxymethyl-7-phthalimido-2-cephem-4-carboxlate are treated in the manner set forth in Example 1 using 33 mg. N-bromosuccinimide. The desired product is recovered. Yield 30 mg. M.P. 258°–261°.

EXAMPLE 3

Methyl 3-formyl-7-phenylacetamido-2-cephem-4-carboxylate

150 Mg. (0.37 meq) methyl 3-acetoxymethyl-7-phenylacetamido-2-cephem-4-carboxylate are reacted in a manner similar to Example 1 using 66 mg. (0.37 meq) N-bromosuccinimide. The desired product is recovered.

EXAMPLE 4

3-Formyl-7-phthalimido-2-cephem-4-carboxylic acid

125 Mg. (0.25 meq) 3-benzoyloxymethyl-7-phthalimido-2-cephem-4-carboxylic acid were reacted with 34 mg. (0.25 meq) sulphuryl chloride in methylene chloride. The desired product is recovered.

EXAMPLE 5

Sodium Salt of 3-Formyl-7-phthalimido-2-cephem-4-carboxylic acid

3 Grams (8.4 meq) sodium salt of 3-acetoxymethyl-7-phthalimido-2-cephem-4-carboxylic acid was treated with 1.13 grams sulphuryl chloride in dimethoxyethane. The desired product is recovered.

EXAMPLE 6

Methyl-7-amino-3-formyl-2-cephem-4-carboxylate

200 Mg. (0.53 meq) methyl 3-formyl-7-phthalimido-2-cephem-4-carboxylate is suspended in refluxing ethanol. Then 46 mg. (1.45 meq) hydrazine is added and the mixture allowed to reflux for 7 min. The reaction mixture is cooled and treated with two drops glacial acetic acid, diluted with chloroform and washed with cold dilute hydrochloric acid. The acidic layer is basified and extracted with chloroform. The chloroform extract is dried over magnesium sulphate and evaporated in vacuo to give 87 mg. of the desired product.

EXAMPLE 7

Trichloroethyl-3-formyl-7-amino-2-cephem 4-carboxylate

Following the procedure of Example 6, but utilizing the product of Example 2 (256 mg.), in lieu of methyl-3-formyl-7-phthalimido-2-cephem-4-carboxylate, the desired product is obtained.

EXAMPLE 8

7-(α-Thienylacetamido)-3-formyl-2-cephem-4-carboxylic acid

Following the procedure of Example 4, but utilizing 7-(α-thienylacetamido)-3-(acetoxymethyl)-2-cephem-4-carboxylic acid in lieu of 3-benzoxymethyl-7-phthalimido-2-cephem-4-carboxylic acid, the product recovered is 7-(α-thienylacetamido)-3-formyl-2-cepham-4-carboxylic acid.

EXAMPLE 9

7-(2-Phenylacetamido)-3-formyl-2-cephem-4-carboxylic acid

Following the procedure of Example 1, but utilizing 3-acetoxymethyl-7-[2-phenylacetamido]-2-cephem-4-carboxylic acid in lieu of methyl 3-acetoxymethyl-7-phthalimido-2-cephem-4-carboxylate, the product recovered is 7-[2-phenylacetoxyamido]-3-formyl-2-cephem-4-carboxylic acid.

EXAMPLE 10

7-(2-Amino-2-phenylacetamido)-3-formyl-2-cephem-4-carboxylic acid

Following the procedure of Example 1, but utilizing 7-(2-amino-2-phenylacetamido)-3-acetoxymethyl-2-cephem-4-carboxylic acid in lieu of methyl 3-acetoxymethyl-7-phthalimido-2-cephem-4-carboxylate, the product recovered is 7-(2-amino-2-phenylacetamido)-3-formyl-2-cephem-4-carboxylic acid.

What is claimed is:

1. A process for producing Δ$^2$-cephalosporin-3-aldehydes having the formula

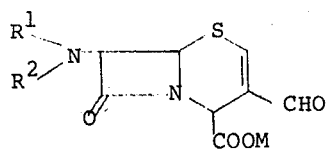

wherein $R^1$ is selected from the group consisting of lower alkanoyl, thienylacetyl, phenylacetyl, phenoxyacetyl, benzoyl, chloroacetyl, 2-amino-2-phenylacetyl, and α-amino-cyclohexadienylacetyl; $R^2$ is hydrogen; $R^1R^2N$ taken together are phthalimido; and M is selected from the group consisting of hydrogen, lower alkyl, trichloroethyl, and a pharmaceutically acceptable nontoxic salt thereof; which comprises treating a compound having the formula

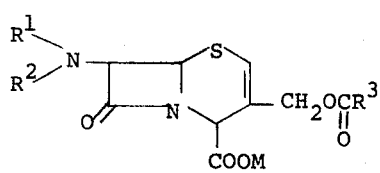

wherein $R^3$ is selected from the group consisting of lower alkyl, phenyl, chlorophenyl, lower alkoxyphenyl, benzyl, and styryl; with a halogenating agent selected from the group consisting of N-bromosuccinimide, N-chlorosuccinimide, N-chlorophthalimide, N-bromoacetamide, sulfuryl chloride, t-butylhypoiodite, molecular chlorine, and molecular bromine; in the presence of a catalytic amount of a catalyst selected from the group consisting of hydrogen peroxide, benzoyl peroxide, t-butyl hydroperoxide, acetyl peroxide and azobisisobutyronitrile and a solvent selected from the group consisting of chloroform, methylene chloride, and dimethoxyethane.

2. The process of claim 1 wherein the catalyst is present at from 0.001 to 1 percent of the reaction solution.

3. The process of claim 2 wherein the compound being treated is methyl 3-acetoxymethyl-7-phthalimido-2-cephem-4-carboxylate, the halogenating agent is N-bromosuccinimide and the catalyst is azobisisobutyronitrile.

4. A process of preparing compounds having the formula

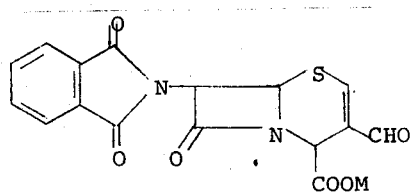

which comprises refluxing a compound having the formula

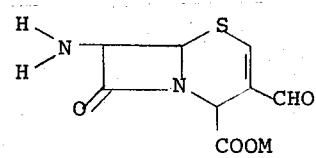

wherein M is as defined in claim 1 with hydrazine in an organic solvent and recovering the desired product.

5. The process of claim 4 wherein the organic solvent is ethanol.

* * * * *

UNITED STATES PATENT OFFICE
CERTIFICATE OF CORRECTION

PATENT NO. : 3,864,338
DATED : February 4, 1975
INVENTOR(S) : Ekkehard Böhme, Joseph E. Dolfini It is certified that error appears in the above-identified patent and that said Letters Patent are hereby corrected as shown below:

Col. 6, the formulas in claim 4 should be in reverse order.

Signed and sealed this 13th day of May 1975.

(SEAL)
Attest:

RUTH C. MASON
Attesting Officer

C. MARSHALL DANN
Commissioner of Patents
and Trademarks